United States Patent [19]

Heintzelman

[11] 4,198,944
[45] Apr. 22, 1980

[54] SPARK PLUG ADAPTER AND PROCESS

[76] Inventor: Leo A. Heintzelman, 4990 Burlingame, Wyoming, Mich. 49509

[21] Appl. No.: 787,356

[22] Filed: Apr. 14, 1977

[51] Int. Cl.² ............................................. F02P 1/00
[52] U.S. Cl. ............................................... 123/169 R
[58] Field of Search ............ 123/148 A, 169 R, 169 C, 123/169 CB

[56] References Cited

U.S. PATENT DOCUMENTS

| | | | |
|---|---|---|---|
| 1,290,376 | 1/1919 | Shaw | 123/169 R |
| 1,320,115 | 10/1919 | Bloomhuff et al. | 123/169 C |
| 1,322,493 | 11/1919 | Little | 123/169 R |
| 1,357,661 | 11/1920 | Vail | 123/169 R |
| 2,292,409 | 8/1942 | Steward | 123/169 R |
| 3,124,113 | 3/1964 | May et al. | 123/169 R |
| 3,710,764 | 1/1973 | Jozlin | 123/325 P |
| 3,710,772 | 1/1973 | Warner | 123/169 R |
| 3,926,156 | 12/1975 | McCormick | 123/41.69 |

*Primary Examiner*—Charles T. Jordan
*Attorney, Agent, or Firm*—Gordon W. Hueschen

[57] ABSTRACT

A spark plug adapter is provided with a small lower portion adapted to be threaded into the spark plug-receiving bore of an internal combustion engine and an upper enlarged portion adapted to receive the spark plug. Around the spark gap of the spark plug is relatively large chamber which functions together with an axial bore which extends through the lower portion as a preliminary combustion chamber. A relatively thin transverse member is arranged diametrically across the axial bore and functions to divide the combustion products into two separate and substantially equal streams and to impart a turbulence thereto as they pass into the internal combustion engine. If desired, the transverse member may carry a conical member with its apex directed toward the spark gap and its base uniformly spaced from the axial bore in order to direct the combustion products in substantially annular sheet form into the internal combustion engine.

20 Claims, 12 Drawing Figures

U.S. Patent  Apr. 22, 1980  4,198,944
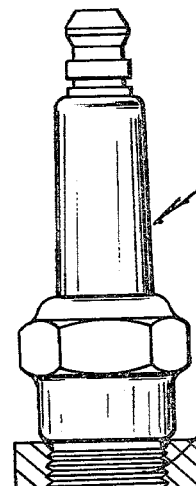
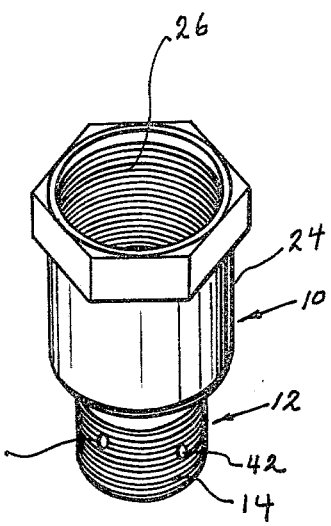
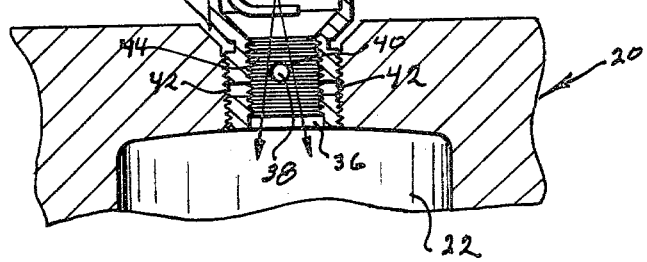
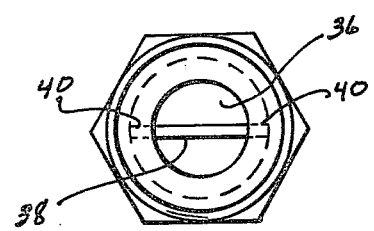
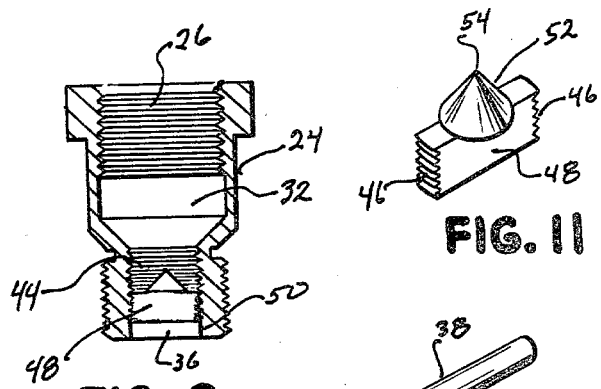
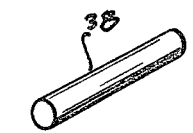
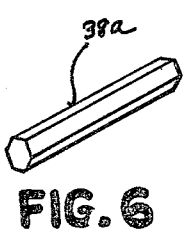
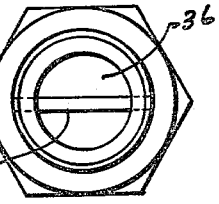
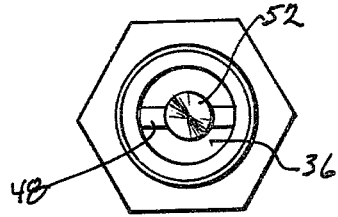
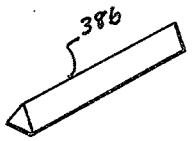
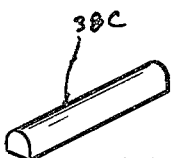

SPARK PLUG ADAPTER AND PROCESS

BACKGROUND OF THE INVENTION

1. Field of the Invention

The invention relates to a spark plug adapter for internal combustion engines having means for dividing preliminary combustion products into two separate and substantially equal streams and imparting turbulence thereto as they pass into the internal combustion engine and to a process for operating an internal combustion engine.

2. Prior Art

In my copending application Ser. No. 667,021, filed Mar. 15, 1976, now U.S. Pat. No. 4,123,998, issued Nov. 7, 1978 I have disclosed conical means for intercepting combustion products of the preliminary combustion chamber and dispersing them in an annular or coniform sheet form into the internal combustion engine. As disclosed in this application that the cone can be supported on a transverse member adapted to be secured to the skirt of a spark plug or adapted to be fastened into the spark plug-receiving bore of the internal combustion engine. In this device, the cone-shaped member is so large as compared with the transverse member that the effect of the cone-shaped member predominates and the transverse member functions merely as a support for the cone-shaped member.

A number of spark plug adapters are known in the prior art, see for example U.S. Pat. Nos. 1,320,115; 1,357,661; 3,710,764 and 3,926,156, but none of these have a relatively thin transverse member adapted to divide the combustion products into two separate and substantially equal streams and to impart turbulence thereto as they pass into the internal combustion engine.

OBJECTS OF THE INVENTION

It is an object of the invention to provide a spark plug adapter and a process which will increase the efficiency of an internal combustion engine. It is a further object of the invention to provide a spark plug adapter and a process in which a preliminary combustion is effected and the preliminary combustion products divided into two separate and substantially equal streams and turbulence thereto as they pass into the internal combustion engine where they function to induce combustion of the combustible mixture therein. It is a further object of the invention to provide a spark plug adapter of the class described which is of simple and effective construction. It is a further object of the invention to provide a spark plug adapter of the class described in which the means for dividing the preliminary combustion products into two separate streams and be readily and easily adjusted. Further objects of the invention are to avoid the disadvantages of the prior art and to obtain advantages as will appear as the description proceeds.

BRIEF DESCRIPTION OF THE INVENTION

The invention is directed to a spark plug adapter for an internal combustion engine which comprises, means for segregating a portion of the combustible mixture in a preliminary combustion chamber and means for dividing the combustion products into two separate and substantially equal streams and for imparting turbulence thereto as they pass from the preliminary combustion chamber into the main combustion chamber of the internal combustion engine.

The invention also is directed to a process for operating an internal combustion engine in which a portion of the combustible mixture is segregated and ignited and the combustion products thereof divided into two separate and substantially equal turbulent streams, and said streams commingled with the remainder of the combustible mixture.

Advantageously, the spark plug adapter of the invention comprises a hollow member having a relatively small portion provided with a male thread complementary to the female thread in a spark plug-receiving bore of the internal combustion engine, and a relatively large upper portion provided with a female thread complementary to the male thread of a spark plug, whereby the lower portion of the hollow member can be threaded into the spark plug-receiving bore of an internal combustion engine and a spark plug threaded into the upper portion of said hollow member, said hollow member comprising a spark plug-receiving portion and a preliminary combustion chamber having an enlarged portion adapted to surround the spark gap of a spark plug when it is seated in said spark plug-receiving bore, and said relatively small portion which is provided by an open-ended axial bore extending then through, and a relatively thin transverse member spanning the axial bore across a diameter thereof, whereby, when a combustible mixture is ignited in the preliminary combustion chamber and the combustion products directed through said axial bore into the internal combustion engine, the transverse member function to divide the combustion products into two separate and substantially equal streams and to impart a turbulence thereto as they pass into the internal combustion engine and there function to ignite the balance of the combustible mixture.

Advantageously, the axial bore and the small portion of the hollow member have a diameter at least 50 percent of the diameter of said small portion. Also, advantageously, the transverse member has a thickness between about 10 and about 25 percent of the diameter of the axial bore.

In accordance with one modification of the invention, the axial bore has an internal female thread and the transverse member has a complementary male thread on each end thereof so that the transverse member can be threaded into the axial bore. In this modification, the position of the transverse member relative to the spark gap can be adjusted according to how far the transverse member is threaded into the axial bore. Advantageously, the axial bore threads extend up to the combustion chamber so that the transverse member can be threaded in from the combustion chamber. Also, it is of advantage that the threads do not extend to the bottom of the axial bore so that the transverse member cannot be removed through the end of the bore.

In accordance with another modification of the invention, the transverse member comprises a rod which may be cylindrical, polygonal in cross section, or have another cross-sectional shape. In this modification, the axial bore of the adapter has diametrically opposed radial complementary holes through which the rod-shaped transverse member can be inserted. Advantageously, at least two sets of such diametrically opposed holes are provided which are axially displaced with respect to one another so that the position of the transverse member can be adjusted by transferring it from one set of holes to another.

In accordance with another modification of the invention, the transverse member may carry a cone with its base resting on the transverse member and its apex directed upwardly toward spark gap. The area of the base of this cone desirably being not more than about 40 percent of the cross-sectional area of the axial bore and the diameter being desirably not more than about 3 times the thickness of the transverse member.

In accordance with one form of the invention, the upper surface of the transverse member can slope upwardly from each side to a line which extends along a diameter of the axial bore. This can be accomplished by use of a triangular-shaped transverse rod or by the proper shaping of the upper surface of the transverse member. In one form of the invention, the transverse member, especially where it has male threads at each end, has an axial dimension which is between about 2 and 3 times that of the transverse dimension. In this form of the device the bottom surface also desirably may angle downwardly from both sides to a line which is a diameter of the axial bore.

BRIEF DESCRIPTION OF THE DRAWINGS

FIG. 1 is an elevation view of one form of the invention with parts in section;

FIG. 2 is an isometric view of another form of the invention;

FIG. 3 is a bottom view of FIG. 2;

FIG. 4 is a top view of FIG. 2;

FIG. 5 is an isometric view of one form of the transverse rod;

FIG. 6 is an isometric view of another form of the transverse rod;

FIG. 7 is an isometric view of another form of the transverse rod;

FIG. 8 is an isometric view of another form of the transverse rod;

FIG. 9 is a side elevation in cross-section view of another form of the invention;

FIG. 10 is a top view of FIG. 9;

FIG. 11 is an isometric view of the transverse member of FIGS. 9 and 10; and

FIG. 12 is an isometric view of another form of the transverse member.

DETAILED DESCRIPTION OF THE INVENTION

Referring now, particularly to FIGS. 1 through 5, there is shown a spark plug adapter according to the invention, comprising a hollow member 10 having a relatively small portion 12 provided with a male thread 14, complementary with the female thread 16 in the spark plug-receiving bore 18 of an internal combustion engine 20, a cylinder 22 of which is shown in the fragmentary cross-sectional view. The hollow member 10 has a relatively large upper portion 24 provided with a female thread 26, which is complementary with the male thread 28 of the spark plug 30. The portion of the hollow member 10 which extends below the spark plug-receiving portion 26 constitutes a preliminary or auxiliary combustion chamber which has an enlarged upper portion 32 adapted to surround the spark gap 34, and an open-ended axial bore 36 projecting downwardly through the relatively small portion 12 of the hollow member 10. The open end of this bore communicates directly with the cylinder 22 of the internal combustion engine 20.

Extending diametrically across the axial bore 36, is a cylindrical rod 38 which is fixed to the sidewalls of the axial bore 36 at diametrically opposite points by means of complementary diametrically disposed radial holes 40. These holes 38 are such size that the rod 38 can be inserted therein with a frictional fit, and the rod 38 is of such length that it does not extend beyond the bottom of the grooves of the female threads 16 of the spark plug-receiving bore 18. Thus, when a rod is inserted or driven in through the holes 40, it will span the axial bore 36 along a diameter thereof, and be affixed thereto at diametrically opposite points.

On compression of a combustible mixture, a portion thereof is segregated in the combustion chamber and when ignited by the spark gap 34, the combustion products pass through the axial bore into the cylinder or main combustion chamber. As they pass through this axial bore, they are divided by the transverse rod 38, into separate and substantially equal streams and have turbulence imparted thereto, so that when they commingle with the remainder of the combustible mixture in the cylinder 22, improved combustion is obtained.

If desired, the relatively small portion 12 can be provided with a second set of diametrically opposed radial holes 42, which are axially displaced with respect to the first set 40, as shown particularly in FIGS. 1 and 2. Thus, by inserting the rod 38 in the holes 42, rather than in the holes 40, the space between the rod and the spark gap 34 can be increased. This adjustment can easily be made in accordance with the idiosyncrasies of any particular internal combustion engine.

As shown in FIGS. 6, 7 and 8, the transverse rod 38 can have other cross-sectional configurations. Thus, in FIGS. 6 and 7, the rods have polygonal configuration, the rod 38, having a hexagonal cross-section and the rod 38b having the cross-section of an equilateral triangle. In FIG. 8, the rod 30b has a cross-section, roughly of a semicircle. It will be understood that the configuration in FIG. 7 could be that also of an isosceles triangle. The important thing being, that the top slopes upwardly from each side to a transverse line, which is a diameter of the axial bore 36 when the rod 38b is in place. It will be understood, also that the configuration can be that of a square or two of the rods 38b inserted with their bases coinciding. In which case, the upper surface can be considered as tapering upwardly from each side to a diametric line, and downwardly from each side to a diametric line.

Optionally, the axial bore 36 may be provided with a female thread 44, for the purpose which will be described in connection with FIGS. 9 through 12.

In the modifications shown in FIGS. 9 through 12, the axial bore has a female thread 44 complementary with male threads on the opposite ends of the transverse member 48. The thread 48 extends upwardly to the preliminary combustion chamber 34, so that the transverse member 48 can be inserted from the top and threaded down into the axial bore, according to whatever distance it is desired to have the transverse member 44 spaced from the spark gap 34. The threads 44 do not extend all the way to the bottom of the axial bore 36, leaving the unthreaded portion 50, which acts as a stop to prevent the transverse member 48 from being taken out of the open end of the hollow member 10. This prevents it from working loose and entering into the cylinder 22.

As shown in FIGS. 9, 10 and 11, the transverse member 48 may carry on its upper surface, an inverted cone 52 having its apex 54 axially disposed and pointed toward the spark gap. Advantageously, the base of this cone has an area which does not exceed about 40 percent of the cross-sectional area of the axial bore, and a diameter that is not more than 3 times the thickness of the transverse member. The cone base is uniformly spaced from the walls of the axial bore forming an annular opening interrupted only by the transverse member 48.

In the form of the invention shown in FIG. 12, the transverse member 48a has its upper surface angling upwardly from each side to a transverse line 56, which when the transverse member 48a is inserted in the axial bore 36, lies in a diameter of that bore. If desired, the bottom of the transverse member 48a may have a complementary configuration in which the bottom angles downwardly from each side to a transverse line 58, which when the transverse member 48a is inserted in the axial bore 38, also lies in a diameter of that bore.

It will be seen from the foregoing description, that the invention comprises a simple spark plug adapter having the capability of segregating a portion of the combustible mixture of an internal combustion engine in a preliminary or auxiliary combustion chamber, dividing the combustion products of the preliminary combustion chamber into separate and substantially equal streams, and imparting turbulence thereto as they pass from the preliminary combustion chamber into the main combustion chamber, with the result that as the preliminary combustion products are commingled with the remainder of the combustible mixture, substantially improved combustion is obtained.

It is to be understood that the invention is not to be limited to the exact details of operation or structure shown and described, as obvious modifications and equivalents will be apparent to one skilled in the art.

I claim:

1. A spark plug adapter for an internal combustion engine comprising a hollow member having a relatively small portion provided with a male thread complementary to the female thread in the bore of the internal combustion engine, which bore is intended to receive said spark plug and which thread is complementary to the male thread of said spark plug, and a relatively large upper portion provided with a female thread complementary to the male thread of said spark plug whereby the lower portion of said hollow member can be threaded into the spark plug-receiving bore of the internal combustion engine and said spark plug threaded into the upper portion of said hollow member, said hollow member comprising a preliminary combustion chamber having an enlarged upper portion adapted to surround the spark gap of said spark plug when it is threaded in said bore and a relatively small lower portion provided by an open-ended axial bore and extending into the threaded bore but not below the bottom thereof, and a relatively thin transverse member spanning said axial bore across a diameter thereof which functions to divide the preliminary combustion products into two separate and substantially equal streams and to impart a turbulence thereto as they pass into the internal combustion engine, said axial bore extending to an unobstructed axial opening through which pass into said internal combustion engine all of said preliminary combustion products which have been divided by said transverse member.

2. The spark plug adapter of claim 1 in which the axial bore has a diameter at least equal to 50 percent of the outside diameter of said lower portion.

3. The spark plug adapter of claim 1 in which the transverse member has a thickness between about 10 and about 25 percent of the diameter of said axial bore.

4. The spark plug adapter of claim 1 in which the axial bore has a diameter at least equal to 50 percent of the outside diameter of said lower portion and said transverse member has a thickness between about 10 and about 25 percent of the diameter of said axial bore.

5. The spark plug adapter of claim 1 in which said transverse member is a rod set in diametrically opposed radial holes in the threaded portion of said lower portion.

6. The spark plug adapter of claim 1 in which the threaded portion of said lower portion has a second set of diametrically opposed radial holes axially displaced from the first set whereby the space between said transverse member and the spark gap can be increased or decreased according to which set of diametrically opposed radial holes is used.

7. The spark plug adapter of claim 1 in which said axial bore has a female thread and the transverse member has a complementary male thread at each end whereby it can be threaded into said axial bore and the space between said transverse member and the spark gap increase by screwing said transverse member farther into said lower portion and vice versa.

8. The spark plug adapter of claim 7 in which the threads in said axial bore extend up to the enlarged portion of said preliminary combustion chamber so that said transverse member can be threaded in through the enlarged upper portion of said hollow member and terminate before the end of said axial bore so that said transverse member cannot be removed through that end.

9. The spark plug adapter of claim 1 in which said transverse member has axially disposed on its upper surface a cone-shaped member the apex of which points toward the spark gap and the base of which is uniformly spaced from the sides of said axial bore.

10. The spark plug adapter of claim 9 in which the area of the base of the cone is not more than about 40 percent of the cross-sectional area of said axial bore and its diameter thereof is not more than 3 times the thickness of said transverse member.

11. The spark plug adapter of claim 4 in which said transverse member has axially disposed on its upper surface a cone-shaped member the apex of which points toward the spark gap and the base of which is uniformly spaced from the sides of said axial bore.

12. The spark plug adapter of claim 1 in which the upper surface of said transverse member angles up from each side to a transverse line which extends diametrically across said axial bore.

13. The spark plug adapter of claim 1 in which said transverse member has a cylindrical cross-section.

14. The spark plug adapter of claim 1 in which said transverse member has a polygonal cross-section.

15. The spark plug adapter of claim 1 in which said transverse member has a triangular cross-section with two sides extending upwardly from a base to a junction line which extends diametrically across said axial bore.

16. The spark plug adapter of claim 5 in which said transverse member has a thickness between about 10 and about 25 percent of the diameter of said axial bore and said axial bore has a diameter at least equal to about 50 percent of the outside diameter of said lower portion.

17. The spark plug adapter of claim 7 in which said transverse member has a thickness between about 10 and about 25 percent of the diameter of said axial bore and said axial bore has a diameter at least equal to about 50 percent of the outside diameter of said lower portion.

18. The spark plug adapter of claim 1 in which the axial dimension of said transverse member is substantially equal to its small transverse dimension.

19. The spark plug adapter of claim 1 in which the axial dimension of said transverse member is between about 2 and about 3 times its small transverse dimension.

20. The spark plug adapter of claim 18 in which the upper surface of said transverse member angles up from each side to a transverse line which extends diametrically across said axial bore and the bottom surface of said transverse member angles downwardly from each side to a transverse line which extends diametrically across said bore.

* * * * *

UNITED STATES PATENT AND TRADEMARK OFFICE
CERTIFICATE OF CORRECTION

PATENT NO. : 4,198,944
DATED : April 22, 1980
INVENTOR(S) : Leo A. Heintzelman

It is certified that error appears in the above—identified patent and that said Letters Patent is hereby corrected as shown below:

[57] ABSTRACT, line 5 & 6; "is relatively" should read -- is a relatively --

Col. 6, line 13; "claim 1" should read -- claim 5 --

Signed and Sealed this

Ninth Day of September 1980

[SEAL]

Attest:

SIDNEY A. DIAMOND

Attesting Officer

Commissioner of Patents and Trademarks